US007376878B2

(12) United States Patent
Kleewein et al.

(10) Patent No.: US 7,376,878 B2
(45) Date of Patent: May 20, 2008

(54) COMPENSATING FOR ERRORS RECEIVED IN A SIGNAL

(75) Inventors: Robert A. Kleewein, Redmond, WA (US); David R. Fulmer, Redmond, WA (US); Michelle V. Niethammer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/291,320

(22) Filed: Dec. 1, 2005

(65) Prior Publication Data

US 2007/0025736 A1 Feb. 1, 2007

Related U.S. Application Data

(60) Provisional application No. 60/703,221, filed on Jul. 28, 2005.

(51) Int. Cl.
*G06F 11/00* (2006.01)

(52) U.S. Cl. ...................... 714/746; 714/776; 714/774; 714/780; 370/207

(58) Field of Classification Search ..................... None
See application file for complete search history.

(56) References Cited

U.S. PATENT DOCUMENTS

| | | | | |
|---|---|---|---|---|
| 4,291,405 | A * | 9/1981 | Jayant et al. | 714/747 |
| 4,375,099 | A * | 2/1983 | Waters et al. | 714/709 |
| 4,441,192 | A * | 4/1984 | Kita et al. | 375/232 |
| 5,675,569 | A * | 10/1997 | Yamaguchi et al. | 369/59.16 |
| 6,360,090 | B1 * | 3/2002 | Holcombe et al. | 455/307 |
| 6,396,542 | B1 * | 5/2002 | Patel | 348/445 |
| 6,542,560 | B1 * | 4/2003 | Buehrer et al. | 375/346 |
| 6,662,329 | B1 * | 12/2003 | Foster et al. | 714/747 |
| 6,891,496 | B2 * | 5/2005 | Husted et al. | 342/57 |
| 6,999,127 | B2 * | 2/2006 | Ryoo et al. | 348/441 |
| 7,043,680 | B2 * | 5/2006 | Aizawa | 714/776 |
| 2004/0199834 | A1 * | 10/2004 | Fukae | 714/699 |
| 2006/0010361 | A1 * | 1/2006 | Lin | 714/747 |
| 2006/0020996 | A1 * | 1/2006 | Takagi et al. | 725/124 |
| 2006/0203742 | A1 * | 9/2006 | Bui | 370/252 |

* cited by examiner

*Primary Examiner*—Cynthia Britt
*Assistant Examiner*—Merant Guerrier

(57) ABSTRACT

A signal correcting and compensating system including a signal transceiver, a personal computer, a signal database, and a signal correction component. A signal sent by a remote control may be subjected to a distortion causing nuisance before it is received by a transceiver, possibly preventing the signal from being identified. A signal correction component may correct and/or compensate for errors by evaluating the signal and determining a margin of error for identifying information within the signal.

15 Claims, 7 Drawing Sheets

COMPENSATING FOR ERRORS RECEIVED IN A SIGNAL

CROSS-REFERENCE TO RELATED APPLICATION

This application claims the benefit of U.S. Provisional Patent Application No. 60/703,221 filed Jul. 28, 2005, the contents of which are hereby incorporated by reference.

BACKGROUND

This description relates generally to the correction of errors and/or compensation of errors which may be included in signals. In particular, a signal that may be transmitted through the air, such as an infrared (IR) signal, a radio frequency (RF) signal, or the like, may suffer degradation. For example, an IR signal may suffer degradation from thermal sources and the like. Degradation can cause information to be lost or cause the signal to be lost to a receiver. A typical application may be a remote control in communication with a consumer electronics device such as a television, a video cassette recorder, stereo, or the like.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
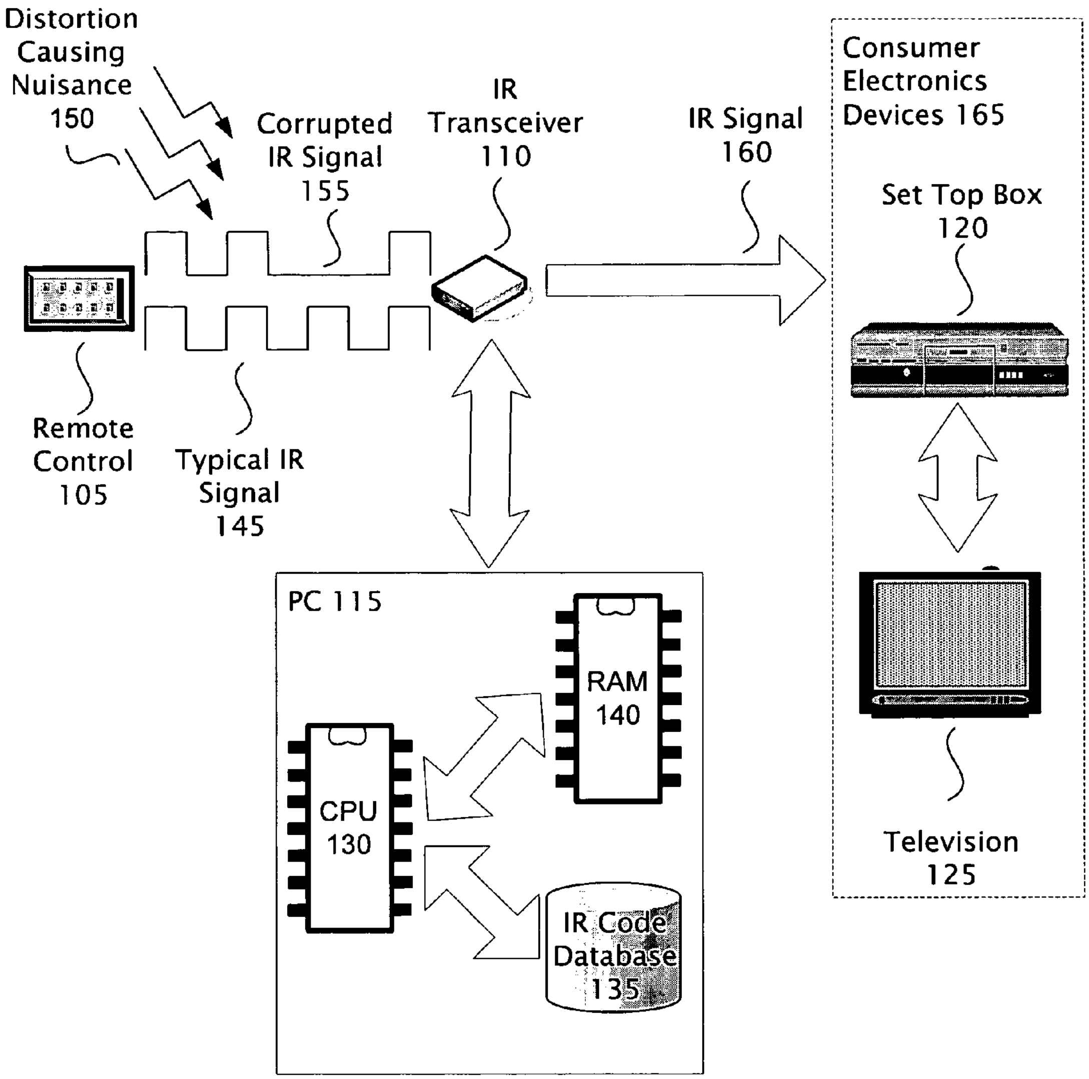
PRIOR ART FIG. 1
FIG. 1 is a block diagram showing a conventional remote control device which may control one or more consumer electronics devices by sending an infrared signal.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a PC system, the system described is provided as an example and not a limitation. As those skilled in the art will appreciate, the present examples are suitable for application in a variety of different types of systems such as a Media Center PC's processor, a consumer electronics (CE) device, television, video cassette recorder, and the like. Also, the infrared signals described below are exemplary. Those skilled in the art will realize that the described compensation can apply to radio frequency and other types of signals.

A Media Center PC may participate in a home theater system and as such may include a signal transceiver, a hard drive or other storage media, an audio and/or video digitizer to convert analog audio and video signals to digital forms that may be stored on the hard drive or other storage media. A Media Center PC may also include an infrared signal database which stores the full set of infrared signals designed to control a wide variety of consumer electronics devices. A user may easily inform the Media Center PC of the identity of the consumer electronics devices participating in the home theater system by sending signals to the signal transceiver using the device's remote control. The Media Center PC may then match the signals received to those stored in the infrared signal database and in doing so identify the device. The Media Center PC may then utilize the stored signals in conjunction with the signal transceiver to act on a user's instructions to schedule and record entertainment programming received from the consumer electronics devices.

Under ideal conditions, signals intended to control a Media Center PC or consumer electronics devices are typically received correctly and completely. However, such signals are frequently subject to elements which may introduce distortion and introduce errors into the signal. Methods and processes for compensating for errors in such signals may allow the signals to be interpreted and the appropriate action to be taken.

An infrared (IR) signal emitted by a conventional remote control may be subject to one or more distortion causing nuisances as it travels to a receiver. Such distortion causing nuisances may be ambient room light, movement of the conventional remote control by a user, or the interference of a physical object. Such distortion causing nuisances may corrupt the IR signal by introducing errors into the IR signal. Such a corrupted signal may cause the remote control to operate improperly. A process for compensating for errors in the corrupted IR signal may allow a corrupted IR signal to be received successfully. An infrared signal correction component and a compensation method as will be described in FIG. 2. The following figure describes how signals may become distorted.

FIG. 1 is a block diagram showing a conventional remote control device which may control one or more consumer electronics devices by sending an infrared signal. Examples of consumer electronics devices may be a PC 115, which may be a Media Center PC, a set top box 120 such as a satellite dish or cable tuner, a television 125, or the like. Such consumer electronics devices are examples only and it is specifically contemplated that any similar type of electronics device may be equivalently substituted without limitation.

A conventional remote control 105 may be coupled to a conventional infrared transceiver 110 by a typical infrared signal 145. Equivalently, a radio frequency (RF) signal or the like may be substituted for the infrared signal. The infrared transceiver 110 may be coupled to one or more consumer electronics devices 165 by a typical infrared signal 160 or its equivalent.

The consumer electronics device 165 may include one or more conventional devices such as a set top box 120, a television 125, or the like. Such devices are typically configured to operate in conjunction with an infrared transceiver 110 or alternatively under direct control of the conventional remote control 105.

Return to the infrared transceiver 110, the infrared transceiver 110 may also be coupled to a PC 115 by any conventional method. The PC 115 typically operates in conjunction with the conventional remote control 105 to control the consumer electronics devices 165. The PC 115 may also receive signals from the consumer electronics device 165 to function as a conventional Media Center PC.

The PC 115 is a conventionally constructed Personal Computer or its equivalent configured to communicate in a conventional manner with the infrared transceiver 110. The PC 115 may be a stand-alone Media Center PC, or it may be a conventional processor incorporated in one or more of the consumer electronics devices 165. Alternatively, the PC 115 may be incorporated into the infrared transceiver 110. The PC 115 typically includes a conventional central processing unit (CPU) 130, a conventional random access memory (RAM) 140, and a conventional infrared code database 135.

The infrared code database 135 is a conventional database storing codes for various functions sent by a remote control 105 or its equivalent. The infrared code database 135 may also store codes for various different remote controls typically provided by various manufacturers.

Software in the PC 115 may typically allow signals from the conventional remote control 105 or consumer electronics devices 165 to be converted to a format the PC 115 may be able to process. Likewise, signals stored within the infrared code database 135 may be converted to infrared codes which may be transmitted by the infrared transceiver 110 and may cause the consumer electronics devices 165 to function appropriately.

It is specifically contemplated that any consumer electronics device which includes a signal transceiver of any type, a central processing unit of any type, memory of any type, and database storage of any type may equivalently provide the functions of the PC 115. An example of such a device may be a universal remote control that may include a central processing unit (CPU). Such an example is provided for illustrative purposes only and is not intended to be limiting in any manner.

The conventional remote control 105 may emit a typical infrared signal 145 which may be received by the IR transceiver 110, the set top box 120, the television 125, or any other type of consumer electronic device. The IR transceiver 110 may also emit an infrared signal 160 which may also control the set top box 120, the television 125, or any other type of consumer electronic device. However, if the signal received is degraded it may not be easily matched.

The conventional remote control may emit a typical infrared signal 145 which is received by the infrared transceiver 110. The infrared transceiver 110 may pass the received typical infrared signal 145 to the CPU 130. The CPU 130 may then search the infrared code database 135 for a match of the typical infrared signal 145.

Once the CPU 130 has discovered a match for the typical infrared signal 145, the CPU 130 may have identified the set top box 120, television 125, or other type of consumer electronics device the conventional remote control is intended to control. Degraded signals may be difficult to match, or may fail to be matched. In discovering the match of the typical infrared signal 145, the CPU 130 may then utilize other infrared signals stored in the infrared code database 135 corresponding to the typical infrared signal 145 to control the consumer electronics devices 165, such as a set top box 120, television 125, or the like.

If the PC 115 is a Media Center PC, it may be useful for the PC 115 to control the consumer electronics devices 165 on behalf of a user of the consumer electronics device 165. For example, a user of the Media Center PC may instruct the Media Center PC to control the consumer electronics device 165 by utilizing the infrared transceiver 110 at a certain time to change the consumer electronics devices 165 to a certain channel.

A media center PC may typically include a hard drive or other form of mass storage, a conventional video graphics hardware device, and a conventional audio and/or video digitizing hardware device which may include a conventional television signal tuner. The hard drive or other form of mass storage may be coupled to the CPU 130, the conventional video graphics hardware device may be coupled to the CPU 130, and the conventional audio and/or video digitizing hardware device may be coupled to the CPU 130. The consumer electronics devices 165 may be coupled to the PC 115 such that the audio and/or video signals sent by the consumer electronics devices 165 may be digitized by the audio and/or video digitizing hardware device and recorded to the hard drive of the PC 115.

Examples of such a Media Center PC are provided in U.S. patent application Ser. No. 10/881,618, filed on Jun. 30, 2004, and U.S. patent application Ser. No. 10/414,713, filed on Apr. 16, 2003, both of which are hereby incorporated by reference in their entirety. Such a Media Center PC may be useful to users as it may record television programs on a user's behalf such that a user may only need to inform the Media Center PC to record a television show series and may not need to select each individual program in the television show series to be recorded.

Further, such a Media Center PC may simplify the task of identifying which consumer electronics devices 165 it may be required to control on the user's behalf by requesting that the user press a button on the conventional remote control 105 which is provided by the manufacturer of the consumer electronics devices 165 as described earlier. However, the typical infrared signal 145 may become a corrupted infrared signal 155 due to the introduction of a distortion causing nuisance 150.

Such a corrupted infrared signal 155 may not be useful in identifying the consumer electronics devices 165, which may be a set top box 120, television 125, or the like. Such a distortion causing nuisance 150 may be the interference of ambient room lighting, an object located near the conventional remote control, or any other entity which introduces errors and causes a corrupted infrared signal 155.

When the corrupted infrared signal 155 is received at the infrared transceiver 110, the transceiver 110 may pass the corrupted infrared signal 155 to the CPU 130. The CPU 130 may then attempt search the infrared code database 135 for a match of the corrupted infrared signal 155.

As previously discussed, the CPU 130 may fail in finding a match as the corrupted infrared signal 155 may contain one or more errors. However, the corrupted infrared signal 155 may contain sufficient information to function if the signal were cleared up. Once cleared up, the signal may be used to identify the consumer electronics devices 165, which may be a set top box 120, television 125, or the like. Such clearing up of the signal may be accomplished in various ways. One such way of clearing up the signal may be a compensation method.

Figure 2:
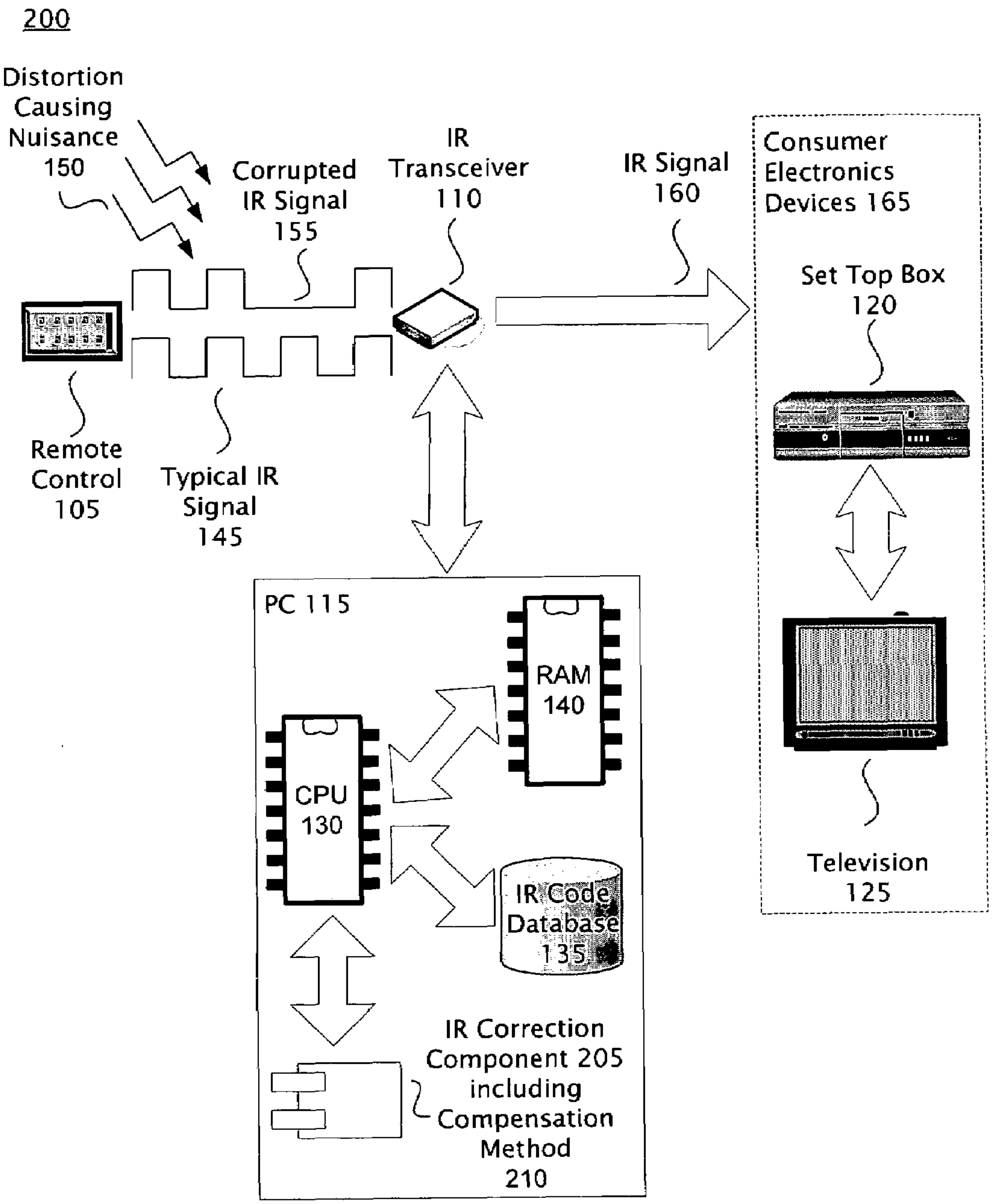
FIG. 2 is a block diagram showing a remote control device which may control one or more consumer electronics devices by sending an infrared signal, and a processor and memory having an infrared signal correction component to correct for distortion in the infrared signal.

FIG. 2 is a block diagram showing a remote control device 105 which may control one or more consumer electronics devices by sending an infrared signal 145 and a processor 130 and memory 140 having an infrared signal correction component 205 to correct for distortion in the infrared signal. Such an infrared signal correction component 205 may implement a compensation method 210 that allows a corrupted infrared signal 155 to be used. The infrared correction component 205 may be equivalently included in the consumer electronics devices 165 which may be a set top box 120, a television 125, or the like.

The components having like numbering from the previous figure function similarly, and the reader is directed to the previous figure for a description of their operation. A description of the new components is provided below.

The infrared correction component 205 includes a compensation method 210 may allow a corrupted infrared signal 155 to be processed by the PC 115. The infrared correction component is typically a software component, or its equivalent, that operates in conjunction with the software of the PC 115 to allow interpretation of a corrupted infrared signal 155 prior to or in conjunction with its processing information from the infrared code database 135.

As previously discussed, the corrupted infrared signal 155 may not be useful in identifying the consumer electronics devices 165. For example, the CPU 130 may fail in finding a match for the corrupted infrared signal 155 as the corrupted infrared signal 155 may contain one or more errors. However, the corrupted infrared signal 155 may contain sufficient information such that compensation for the one or more errors may be applied. Once error compensation has been applied, the corrupted infrared signal 155 is transformed to a compensated infrared signal used to identify the set top box 120, television 125, or other type of consumer electronics device.

Once the CPU 130 has discovered a match for the infrared signal 145 using the compensated infrared signal, the PC 115 may identify the consumer electronics device 165, which may be a set top box 120, a television 125, or other type of consumer electronics device the conventional remote control is attempting to control. In discovering the match of the infrared signal 145, the PC 115 may then utilize other infrared signals stored in the infrared code database 135 corresponding to the infrared signal 145 to control the consumer electronics device 165 which may be a set top box 120, a television 125, or the like.

The infrared correction component 205 and the compensation method 210 implemented by it may compensate for errors from a variety of sources that tend to distort the signal. In order to more clearly understand the corrections made to the signal, further details of the typical signals designed to control a consumer electronics device will be provided. Also, a typical distortion mechanism that may degrade a signal will be defined in greater detail.

Figure 3:
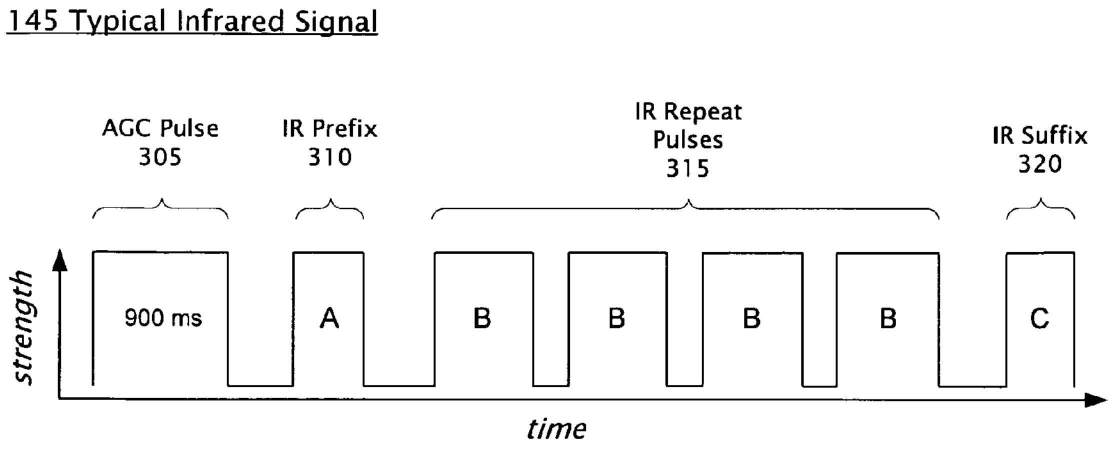
FIG. 3 is a diagram of a typical infrared signal emitted by a remote control device.

FIG. 3 is a diagram of a typical infrared signal emitted by a remote control device 145 (from FIG. 1). The typical infrared signal 145 (from FIG. 1) may be made up of several different sections. Each of these sections may be made on or more pulses some of which may be repeated. In an example, pulses may be repeated while a user holds down a button on a remote control. However, the type of signal emitted by a remote control is not limited to an infrared signal and any other type of signal may be equivalently substituted without limitation. For example, the signal may be a conventional radio frequency (RF) signal or the like.

A typical infrared signal 145 (from FIG. 1) may include an AGC pulse 305 of approximately 900 milliseconds or longer. Such a time specification is included for example only and any acceptable length of AGC pulse 305 may be equivalently substituted. Subsequent to the AGC pulse 305, the typical infrared signal 145 (from FIG. 1) may include an infrared prefix 310. Such an infrared prefix 310 may be optional. The infrared prefix 310 may be included to aid in the identification of the typical infrared signal 145 (from FIG. 1) by a consumer electronics device which may receive the typical infrared signal 145 (from FIG. 1).

A typical consumer electronics device with a remote control receiver may also include an automatic gain control (AGC). Such an AGC may measure an initial pulse length and strength to establish the expected length and strength of subsequent pulses within the signal. The strength, as illustrated by the vertical amplitude, and the length, as illustrated by the horizontal time scale, may be useful to the AGC.

Following the infrared prefix 310 may be a set of infrared repeat pulses 315. The number, length, strength or any other attributes of such infrared repeat pulses 315 are exemplary. The infrared repeat pulses 315 are included in the signal in a repeated manner so as to provide redundant information useful in identifying the typical infrared signal 145 (from FIG. 1). While such infrared repeat pulses 315 are illustrated as being a single pulse, the infrared repeat pulses 315 may include two or more repeated pulses that may comprise the repeat pattern.

Ending the typical infrared signal 145 (from FIG. 1) may be an infrared suffix 320. Such an infrared suffix 320 may be optional. The infrared suffix 320 may also be useful in identifying the end of the typical infrared signal 145 (from FIG. 1).

As previously discussed, such a typical infrared signal 145 (from FIG. 1) may be subject to a distortion causing nuisance 150 (from FIG. 1). The distortion causing nuisance 150 (from FIG. 1) may act upon the typical infrared signal 145 (from FIG. 1) as it travels from the sender to the receiver and degrades the typical infrared signal 145 (from FIG. 1). Once the typical infrared signal 145 (from FIG. 1) has been degraded by the distortion causing nuisance, it may resemble a corrupted infrared signal 155 (from FIG. 1).

Figure 4:
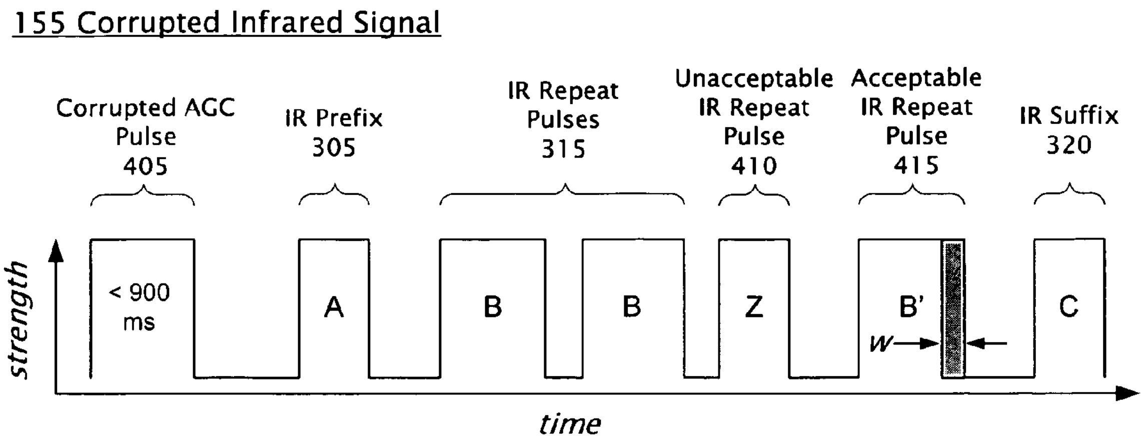
FIG. 4 is a diagram of a typical corrupted infrared signal emitted by a remote control device that has been corrupted by a distortion causing nuisance.

FIG. 4 is a diagram of a typical corrupted infrared signal 155 (from FIG. 1) emitted by a remote control device that has been corrupted by a distortion causing nuisance 150 (from FIG. 1). The distortion causing nuisance 150 (from FIG. 1) may act on the individual pulses that make up an infrared signal causing individual pulses in that infrared signal to be distorted, missing, or otherwise corrupted. In addition to other distortion that may be present, a corrupted infrared signal may include a corrupted AGC pulse 405, a corrupted infrared prefix 305, one or more corrupted repeat pulses 315, and a corrupted infrared suffix 320.

The corrupted AGC pulse 405 may be received by the AGC. However, the corrupted AGC Pulse 405 may have a length which is shorter than expected. For example, the corrupted AGC Pulse 405 may be less than the expected 900 milliseconds in length. The introduction of a distortion causing nuisance 150 (from FIG. 1) may distort the AGC pulse such that it may resemble a corrupted AGC pulse 405. The corrupted AGC pulse 405 is provided as an example only and one or more different errors may be equivalently introduced into the corrupted AGC pulse 305.

A corrupted infrared signal 155 (from FIG. 1) may include an infrared prefix 310. Such an infrared prefix 310 may be optional. As discussed previously, the infrared prefix 310 may be included to aid in the identification of the corrupted infrared signal 155 (from FIG. 1) by a consumer electronics device. While the infrared prefix 310 included in the corrupted infrared signal 155 (from FIG. 1) is depicted as having no errors, the infrared prefix 310 may include any type of error.

Following the infrared prefix 310 may be one or more correct infrared repeat pulses 315, unacceptable infrared repeat pulses 410, and acceptable infrared repeat pulses 415. The order, length, strength, and other attributes of the correct infrared repeat pulses 315, unacceptable infrared repeat pulses 310, and acceptable infrared repeat pulses 415 are provided as an example only. Unacceptable infrared repeat pulses 315 may be mixed among acceptable repeat pulses. The correct infrared repeat pulses 315 and the corrupted forms of the correct infrared repeat pulse 315 may include two or more repeated pulses and are not limited in the number of pulses that may comprise the repeat pattern in any way.

One or more corrupted forms of the correct infrared repeat pulse 315 may be included in the correct set of infrared repeat pulses 315. For example, the signal may include at least one unacceptable infrared repeat pulse 410. An unacceptable infrared repeat pulse 410 may be determined to be unacceptable because the length of the pulse may have been distorted by a distortion causing nuisance 150 (from FIG. 1). Such a distortion may result in the length or the strength of the unacceptable repeat pulse 410 being too large or too small. However, the distortion causing nuisance 150 (from FIG. 1) may introduce any equivalent type of error into the unacceptable infrared repeat pulse 410.

An acceptable infrared repeat pulse 415 may be included within the set of correct infrared repeat pulses 315. Such an acceptable infrared repeat pulse 415 may also have had an error introduced by a distortion causing nuisance 150 (from FIG. 1). Such a distortion may result in the length or the strength of the acceptable infrared repeat pulse 415 being too large or too small. However, if the length of time the acceptable infrared repeat pulse 415 is short, designated by the letter "w", the length of the acceptable infrared repeat pulse 415 may fall within a margin where the error may be disregarded.

An infrared suffix 320 may end the corrupted infrared signal 155 (from FIG. 1). The infrared suffix 320 may be useful in identifying the end of the typical infrared signal. While the infrared suffix 320 illustrated in the example corrupted infrared signal 155 (from FIG. 1) does not include an error, the infrared suffix 320 may equivalently include any type of error.

The errors illustrated in the corrupted infrared signal 155 (from FIG. 1) may prevent a consumer electronics device from identifying the command indicated by the infrared prefix, suffix, and repeat pulses. For example, the distortion may render the signal unrecognizable to software or circuitry that may be utilized to match a received signal to a stored pattern. A method for correcting the errors in a corrupted infrared signal 155 (from FIG. 1) may allow a consumer electronics device to interpret the corrupted infrared signal 155 (from FIG. 1) and function appropriately. Such a method for correcting errors is as follows.

Figure 5:
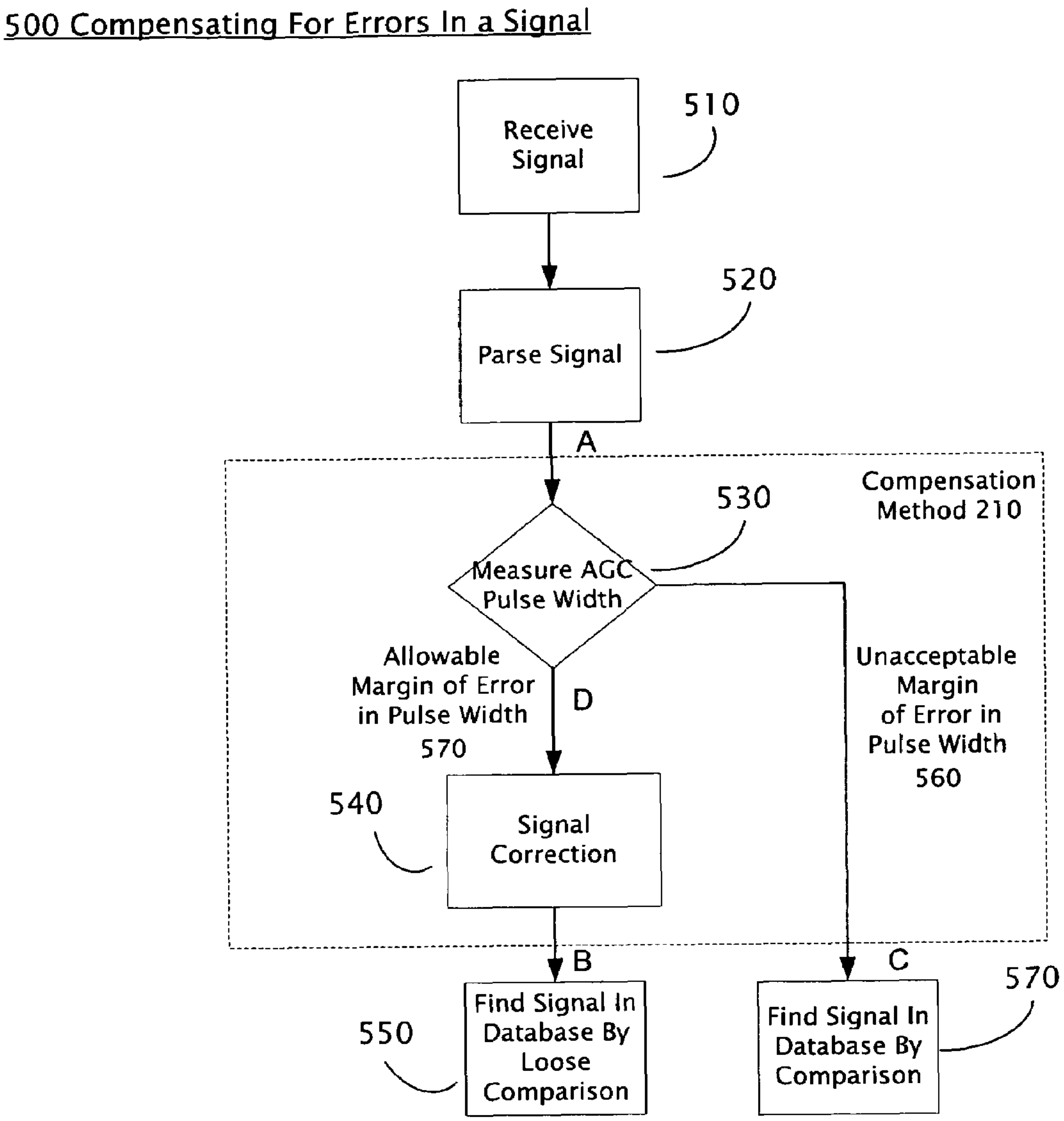
FIG. 5 is a flow diagram showing a method for compensating for errors in the corrupted infrared signal.

FIG. 5 is a flow diagram showing a method for compensating for errors in the corrupted infrared signal including AGC pulse measurement and signal correction. Such a method for compensating for errors is not limited to compensating for errors in an infrared signal, and the method may be equivalently applied to any type of signal. For example, the method may be applied to a radio frequency (RF) signal or any other type of signal.

As previously discussed, the compensation method 210 (from FIG. 2) may be implemented in an infrared correction component 205 (from FIG. 2). The infrared correction component 205 (from FIG. 2) is typically a software component or its equivalent, but such a compensation method 210 (from FIG. 2) may be equivalently implemented in any type of consumer electronics device which includes a processor and memory. If the correction component 205 (from FIG. 2) is executed in a PC environment with an operating system, the correction component 205 (from FIG. 2) typically implements a standard interface expected by the operating system. Such a standard interface may allow the operating system to expose the functionality and may allow reuse of the correction component 205 (from FIG. 2) to other components and applications which may execute in the operating system.

At block 510 a signal, such as an infrared remote control signal, may be received. A receiver may be provided in a PC 115 (from FIG. 1) or consumer electronics devices 165 (from FIG. 1) which may be a set top box 120 (from FIG. 1), a television 125 (from FIG. 1), or the like. Reception of the signal may be achieved by conventional methods.

At block 520 the received signal may be parsed into one or more discrete portions. Such parsing may take the form of splitting the signal into one or more discrete portions based on time, length, strength or any other criteria without limitation. The process of parsing a signal into discrete portions is conventionally performed.

The compensation method 210 (from FIG. 2) may be applied to the parsed signal. The compensation method 210 (from FIG. 2) may include measuring the AGC pulse width 530 and signal correction 540.

Flow continues along path A to block 530, where the automatic gain control (AGC) pulse width may be measured. AGC pulse measurement will be discussed more fully in the detailed description of FIG. 6. The measurement of the AGC pulse width may be used to determine whether an allowable margin of error exists in the AGC pulse width, or an unacceptable margin of error exists in the AGC pulse width.

If an unacceptable margin of error is measured in the AGC pulse width 560, flow continues along path C to block 550. When an unacceptable margin of error is measured in the AGC pulse width error correction is typically not performed on the signal. Therefore, the signal may still contain errors when the operation at block 550 is performed. If an allowable margin of error is measured in the AGC pulse width 530, flow continues along path D to block 540.

At block 540, any errors in the signal may be corrected. Correction is typically performed using the allowable margin of error in the pulse width measured at block 530. The process of signal correction at block 540 will be discussed more fully in the detailed description of FIG. 7.

Block 550 is typically an operation in which a database may be searched for a match to the signal received from block 540 along path B. The operation to search the database for a match to the signal may utilize the allowable margin of error in pulse width 570 in finding a match. For example, the comparison operation may use a loose comparison in which the comparison may not yield exact matches, but rather matches falling within the allowable margin of error in pulse width 570.

Block 570 is typically an operation in a database may be searched for a match to the signal received from block 530 along path C, but may not use the allowable margin of error in pulse width 570 in finding a match. For example, the comparison operation may find matches which may match the signal exactly.

Figure 6:
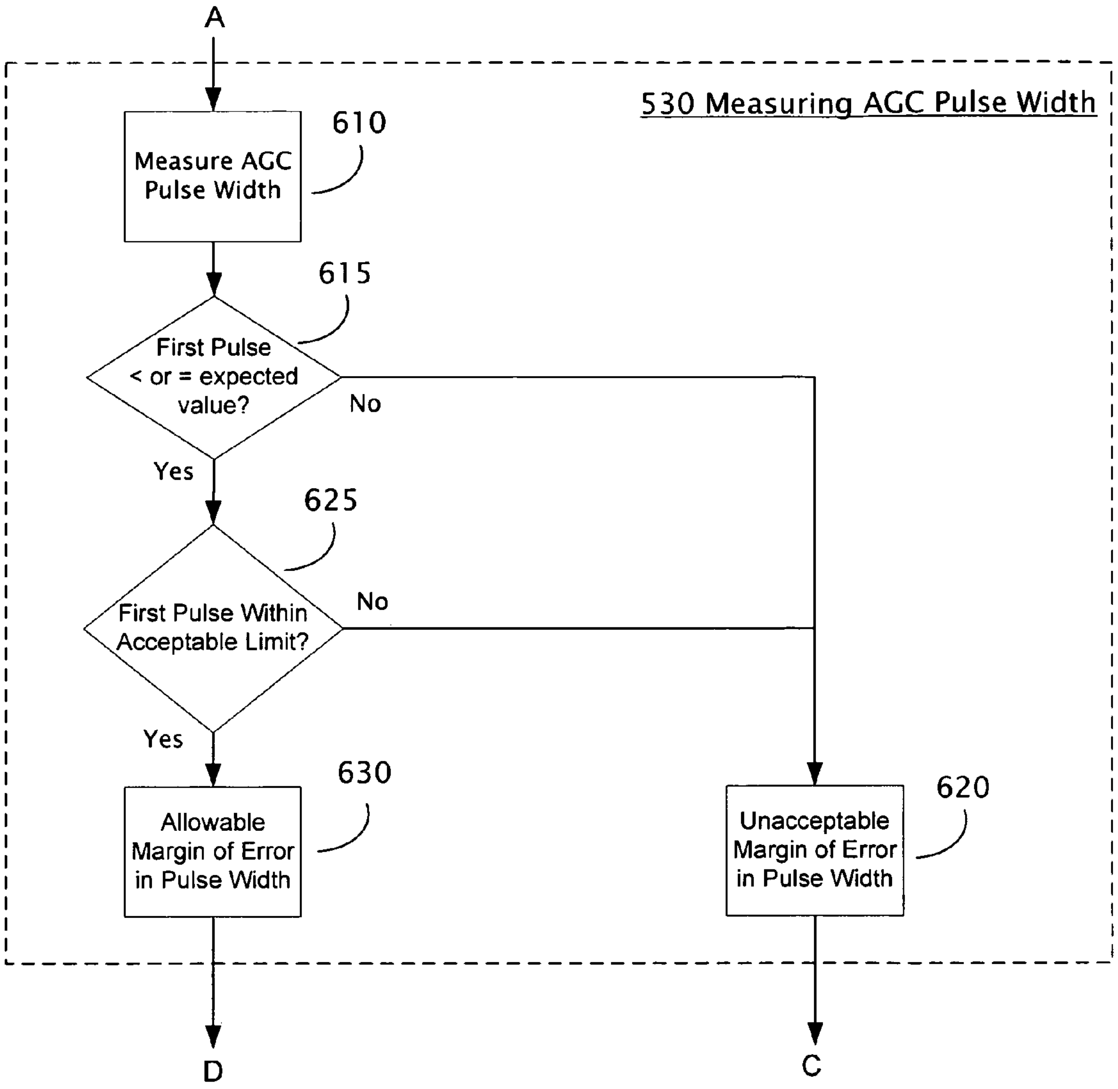
FIG. 6 is a flow diagram showing further detail of a process for compensating for errors in the corrupted infrared signal by measuring the automatic gain control pulse width.

FIG. 6 is a flow diagram showing further detail of a process for measuring the automatic gain control pulse width.

At block 610 the AGC pulse width of the signal received from Block 520 (of FIG. 5) may be measured. Any acceptable method for measuring the AGC pulse may be used. For example, the strength, time, amplitude or any other criteria may be measured with respect to the AGC pulse width. For example, analog techniques may be used or the signal may be digitized and then analyzed.

At block 615 a comparison of the measured AGC pulse width to an expected or predetermined value may be made. For example, if the time length of the AGC pulse width has been measured, a decision at block 610 may be based on a comparison of the measured AGC pulse width against a fixed expected value such as, for example, 900 milliseconds. Any other suitable fixed value may be used as circumstances may require. Any equivalent method of comparing the measured value of the AGC pulse to an expected or predetermined value may be substituted. For example, an analog comparison, a comparison of bits in digitized signals, or other methods could be utilized.

If the AGC pulse is determined to be less than or equal to the expected value flow continues to block 625. However, if the AGC pulse is determined to be greater than the expected value, the signal received at block 610 is determined to include an unacceptable margin of error in the AGC pulse width 620. Flow then continues along path C.

At block 625, a further comparison of the difference between the expected value of the AGC pulse width and the measured value of the AGC pulse width is performed. Various methods of comparing the difference between the expected value of the AGC pulse width and the measured value of the AGC pulse width may be used. However, if the difference between the expected value of the AGC pulse width and the measured value of the AGC pulse width falls outside of a predetermined or prescribed value, the signal received at block 610 is determined to include an unacceptable margin of error in the AGC pulse width 620 and flow continues along path C. Conversely, if the difference between the expected value of the AGC pulse width and the measured value of the AGC pulse width falls within a predetermined or prescribed value, the signal received at block 610 is determined to include an allowable margin of error in the AGC pulse width 630 and flow continues along path D for error compensation.

Figure 7:
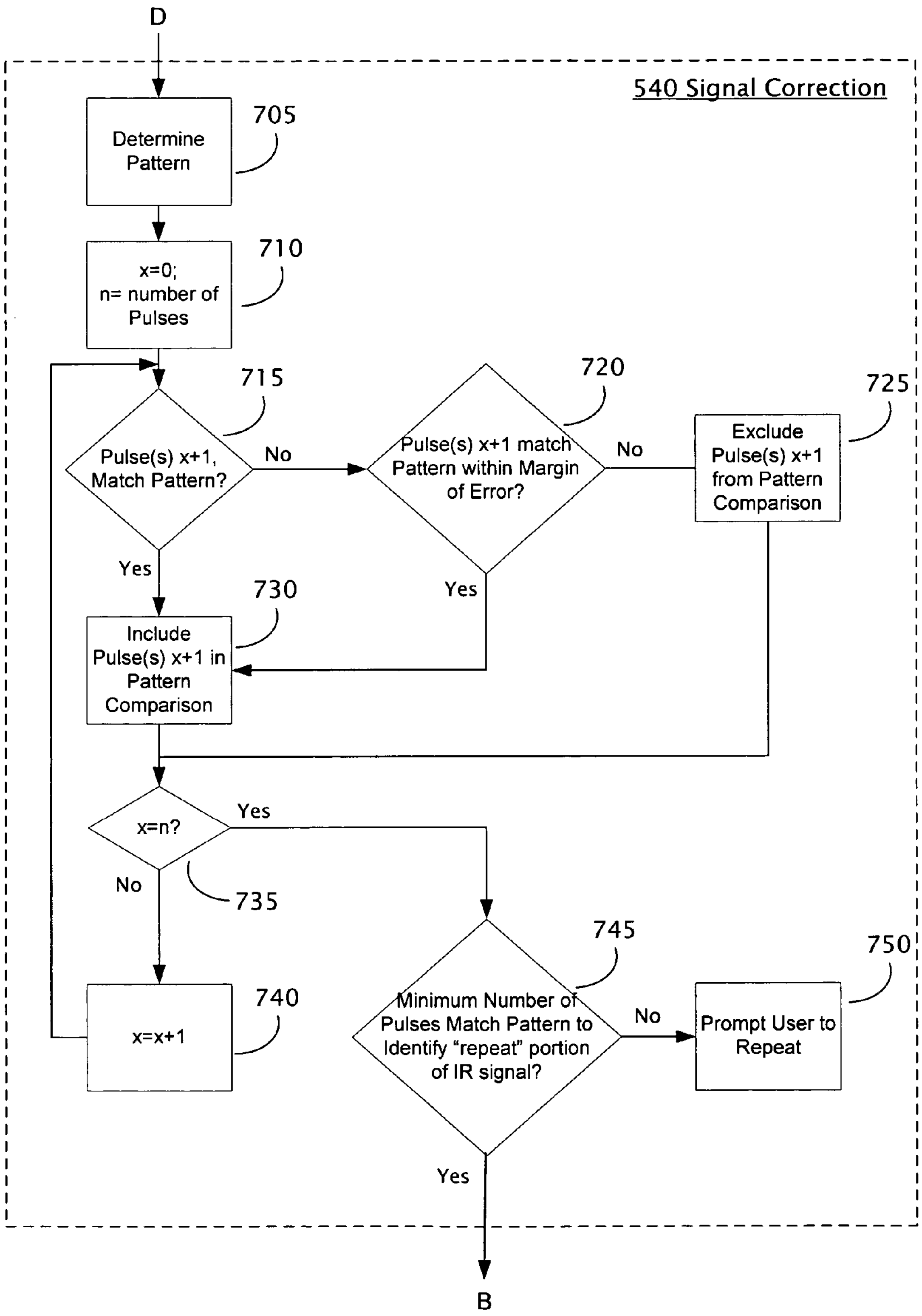
FIG. 7 is a flow diagram showing further detail of a process for compensating for errors in the corrupted infrared signal by correcting errors in the corrupted infrared signal.

FIG. 7 is a flow diagram showing further detail of a process for correcting errors. Signals found to have an allowable margin of error in the AGC pulse width are typically corrected.

At Block 705 an operation to determine a pattern in a signal is performed. The process of determining the pattern within the signal may be performed in various ways. For example, if the received signal is an infrared signal similar to the infrared signals of FIG. 3 and FIG. 4, the pattern may be determined by inspecting the infrared repeat pulses. While the repeat pulses illustrated in FIG. 3 and FIG. 4 are single pulses with a typical form, the length, width, strength, number, or any other criteria for determining a pattern may be used.

For example, the process of determining the pattern may be performed by assigning a value to each similar type of pulse encountered in the signal. More particularly, the first occurrence of a first pulse in the repeat portion of a signal may be assigned the value "B". A first occurrence of a second pulse in the repeat portion of a signal may be assigned the value "C". The second occurrence of the first pulse in the repeat portion of a signal may also be assigned the value "B". The second occurrence of the second pulse in the repeat portion of a signal may also be assigned the value "C". Therefore, the sequence of values of pulses in the signal may be "BCBC". An algorithm may be applied to the value "BCBC" which may in turn determine the pattern to be "BC". It should be appreciated that such a process is provided as an example only and any process which is able to determine the pattern may be equivalently substituted.

At block 710 in which a variable named, for example, "x" is defined, which may act as a numerical counter. The variable "x" may be set to an initial value of zero. Further, a variable named, for example, "n" may be defined which corresponds to the total number of pulses in the received signal. Note that "n" may also refer to the total number of "pattern" pulses included in the received signal. For example, if the pattern is determined to be "BC" as discussed in the previous example and the repeat portion of the signal is determined to be "BCBC", the number of "pattern" pulses equals two.

The variable "x" may be used to designate the position of a pulse or set of pulses within the received signal. That is, in a signal with a set of 5 repeated single pulses, the first pulse is designated to be pulse "1", the second pulse is designated to be pulse"2", and so on. In the example where the set of pulses represents a pattern in the received signal, the first set of pulses is designated "1", the second set of pulses is designed "2", and so on.

At block 715 the value of the variable "x" is incremented by one. Also, the pulse or pulses at position "x+1" of the received signal is compared to the pattern determined at block 705. The previously discussed method of comparing the pulse or pulses may be used. Equivalent methods of comparison may be substituted. In response to a failure to match, flow may continue along to block 720. In response to a match, flow may continue along to block 730.

At block 720, the pulse or pulses at position "x+1" of the received signal are compared to the pattern determined at block 705, however, a greater margin of error in the difference between the pulse or pulses and the pattern determined at block 705 may be used in determining equivalency. For example, the margin of error used may be related to the difference between the expected length of the automatic gain control pulse width and the measured automatic gain control pulse width determined at block 530 of FIG. 5 and FIG. 6. Note that the margin of error used in the comparison at block 720 may be derived from any source and is not limited in any way.

If the pulse or pulses at position "x+1" of the received signal are determined to not be equal to the pattern determined at block 705 within the margin of error, flow continues to block 725. If the pulse or pulses at position "x+1" of the received signal are determined to be equal to the pattern determined at block 705 within the margin of error, flow continues to block 730.

At block 725 an operation to exclude pulses from the pattern comparison may be performed. The pulse or pulses at position "x+1" may be excluded from the pattern comparison, which may be used to identify the received signal at block 735. Such an exclusion of the pulse or pulses at position "x+1" may be called "correcting" or "compensating" for errors in the received signal. Flow continues from block 725 to the input of block 735.

Returning to the output of block 715 for a positive comparison, at block 730 an operation in which the pulse or pulses at position "x+1" are included the pattern comparison which may be used to identify the received signal at block 735.

At block 735 an operation in which the total number of individual pulses or sets of pulses is compared to the value of the counter variable "x". If the variable "x" does not equal the total number of pulses or sets of pulses, flow continues on to block 740. At block 740, the variable "x" may be incremented and flow may return to block 715. If the total number of individual pulses or sets of pulses is equal to the variable "x", all of the individual pulses or groups of pulses may have been processed and therefore flow may continue on to block 745.

At block 745 an operation in which the "corrected" or "compensated" signal may be used to confirm the identity of the signal may be performed. Here a determination may be made if a sufficient number of pulses have been examined.

If the number of pulses or sets of pulses previously identified at block 730 is greater than or equal to an expected or predetermined number, flow may continue along path B. However, if the number of pulses or sets of pulses previously identified at block 730 is less than an expected or predetermined number, the signal may not have been sufficiently "corrected" or "compensated". Such a signal therefore may not be successfully identified, and flow may continue to block 750 where the user may be requested to press the remote control button again, or otherwise try to re-transmit the command.

Methods and procedures for compensating and correcting errors in a received signal have been discussed. Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or may distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system, comprising:

an infrared transceiver; and a media center personal computer, the media center personal computer including a signal database and an infrared signal correction component, the media center personal computer coupled to the transceiver, wherein the signal correction component performs a compensation method comprising:

receiving an infrared signal including an automatic gain control pulse via the infrared transceiver, parsing the infrared signal, measuring the automatic gain control pulse resulting in a measurement, comparing the measurement against a fixed expected value, and determining if the measurement falls within an allowable margin of error and, if so, performing a signal correction method comprising:

determining a pattern in the infrared signal, and if one or more pulses of the infrared signal are determined to not match the pattern within a second margin of error, then:

correcting the infrared signal based at least on the pattern and the one or more pulses resulting in a corrected signal, and searching the signal database for a match to the corrected signal wherein the match is not an exact match but matches within a third margin of error.

2. The system of claim 1, wherein the infrared signal is provided via one or more remote control devices.

3. The system of claim 1, further comprising the media center personal computer recording audio, video, or both from the one or more consumer electronics devices.

4. The system of claim 1, wherein the infrared transceiver is instead a radio frequency signal transceiver.

5. A method, comprising:

receiving a signal;

measuring an initial pulse width of the signal resulting in a measurement;

comparing the measurement against a fixed expected value; and determining if the measurement falls within an allowable margin of error relative to the fixed expected value and, if so, correcting one or more errors in the signal, the correcting comprising:

determining a pattern in the signal and if one or more pulses of the signal are determined to not match the pattern within a second margin of error, then correcting the signal based at least on the pattern and the one or more pulses resulting in a corrected signal.

6. The method of claim 5, wherein the signal is an infrared signal.

7. The method of claim 5, wherein the signal is a radio frequency signal.

8. The method of claim 5, wherein the initial pulse is an automatic gain control pulse.

9. The method of claim 5, wherein the correcting is performed by discarding any pulse in the signal which deviates from a predetermined first value by a second value greater than the initial pulse width of the signal.

10. The method of claim 5, wherein the correcting is performed in a repeated portion of the signal.

11. The method of claim 5, further comprising identifying the corrected signal by searching for a match of the corrected signal in a signal database.

12. A computer-readable storage media having computer-executable modules comprising:

a signal digitizer for storing a received signal;

a signal error correction module for correcting errors in the received signal; and a signal database for storing information related to controlling a consumer electronics device corresponding to the received signal, wherein the signal error correction module performs a compensation method comprising:

receiving the received signal including an automatic gain control pulse, parsing the received signal, measuring the automatic gain control pulse resulting in a measurement, comparing the measurement against a fixed expected value, and determining if the measurement falls within an allowable margin of error and, if so, performing a signal correction method comprising:

determining a pattern in the received signal, and if one or more pulses of the received signal are determined to not match the pattern within a second margin of error, then:

correcting the received signal based at least on the pattern and the one or more pulses resulting in a corrected signal.

13. The computer-readable storage media of claim 12, the signal error correction module further comprising an automatic gain control measurement module operable to perform the measuring of the automatic gain control pulse.

14. The computer-readable storage media of claim 12, the signal digitizer further comprising a signal parsing module operable to perform the parsing of the received signal into discrete portions.

15. The computer-readable storage media of claim 12, the signal error correction module further comprising a signal correction module operable to perform the correcting the received signal including discarding distorted pulses in the received signal.

* * * * *